United States Patent [19]

Sterling, Jr. et al.

[11] Patent Number: 4,607,247
[45] Date of Patent: Aug. 19, 1986

[54] ON-LINE SERIAL COMMUNICATION INTERFACE FROM A TRANSMITTER TO A CURRENT LOOP

[75] Inventors: Edward L. Sterling, Jr., Cleveland; Edward Bastijanic, Concord, both of Ohio

[73] Assignee: The Babcock & Wilcox Company, New Orleans, La.

[21] Appl. No.: 764,917

[22] Filed: Aug. 12, 1985

[51] Int. Cl.$^4$ ............................................. H04M 11/04
[52] U.S. Cl. ........................... 340/310 A; 340/870.19; 340/870.39; 323/318
[58] Field of Search ......... 340/310 A, 825.57, 870.16, 340/870.19, 870.39, 825.36, 825.37; 323/318, 349

[56] References Cited

U.S. PATENT DOCUMENTS 4,016,480  4/1977  Hofmann ........................ 340/310 A
4,413,250  11/1983  Porter et al. .................... 340/870.39
4,520,359  5/1985  Kitagawa et al. .............. 340/870.19

Primary Examiner—John W. Caldwell, Sr.
Assistant Examiner—David A. Okonsky
Attorney, Agent, or Firm—Vytas R. Matas; Robert J. Edwards

[57] ABSTRACT

A serial communication interface establishes communication between the microprocessor of a transmitter, to a current loop powered by a power supply. The microprocessor outputs an analog signal corresponding to a process variable and also outputs a serial communication voltage pulse signal. The analog signal is applied to a current regulating circuit which draws current from the power supply onto the current loop in an amount proportional to the process variable. A comparator has one input connected to the microprocessor for receiving the serial communication voltage pulse signal and another input for receiving a fixed selected voltage. The output of the comparator is connected to an input of the current regulating circuit in such a way so that a signal from the comparator is summed with the analog signal. The output signal of the comparator is modulated in synchronism with the voltage pulses and represents a fraction of the analog signal so that both signals can be supplied to the current loop simultaneously.

4 Claims, 2 Drawing Figures

ON-LINE SERIAL COMMUNICATION INTERFACE FROM A TRANSMITTER TO A CURRENT LOOP

FIELD AND BACKGROUND OF THE INVENTION

The present invention relates in general to serial communication interfaces for digital communications, and in particular to a new and useful interface for establishing digital communications from a transmitter to a two-line current loop.

Two-wire analog transmission systems are well known. Such systems include a transmitter which is connected to a power supply by two wires which form a current loop. The transmitter includes, as at least one of its features, a transducer which senses a condition such as pressure or temperature. This condition is known as a process variable (PV).

A power supply is connected to the two wires to close the current loop. It is also conventional to provide a resistor in the current loop. The transmitter amplifies the signal from its transducer and this amplified signal is used to draw a certain current from the power supply which is proportional or otherwise related to the process variable. It is conventional to draw from a minimum of 4 mA to a maximum of 20 mA. The current between 4 and 20 mA passes through the resistor to produce a voltage drop across the resistor. This voltage can be measured to give a value for the process variable.

It is noted that the 4 mA minimum current is required to energize the circuitry of the transmitter. Any excess current above this 4 mA level is taken as a value which can be used to determine the process variable.

It is known that such 4–20 mA two-wire systems have an accuracy which is limited to around 0.1% at best. These systems are also essentially unidirectional with the transmitter being essentially uncontrolled and transmitting continuously.

The transmitters in such circuits are generally limited in accuracy to about 0.1% and their functionality is limited to only continuous reading and sensing of the process variable.

SUMMARY OF THE INVENTION

The present invention utilizes microprocessor technology to improve the overall accuracy and expand the functionality of transmitter devices.

The present invention provides an apparatus for digital communications from a two-wire current loop transmitter while the transmitter is still on-line (sending analog information) to a controller or some other monitoring device.

Accordingly an object of the present invention is to provide an on-line serial communication interface for a current loop arrangement which includes a power supply for supplying current at varying levels, a current loop connected to the power supply for carrying the current levels, a current regulating circuit connected to the current loop for drawing the current level from the power supply, and a transmitter having microprocessor means with a first port connected to an imput of said current regulating circuit for applying a continuous analog signal to the current regulating circuit for drawing a current level corresponding to a process parameter measured by the transmitter, the microprocessor means having a second port on which a serial communication voltage pulse signal is applied, wherein the interface comprises a comparator having one input connected to the second port of the microprocessor means and a second input connected to a selected fixed source of voltage, the comparator having an output connected to the input of the current regulating circuit for superimposing current pulses on the continuous analog signal, which current pulses respond to the serial communication voltage pulse signals from the microprocessor means.

A further object of the invention is to provide an on-line serial communication interface from a transmitter having a microprocessor, with a current loop connected to the transmitter, which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
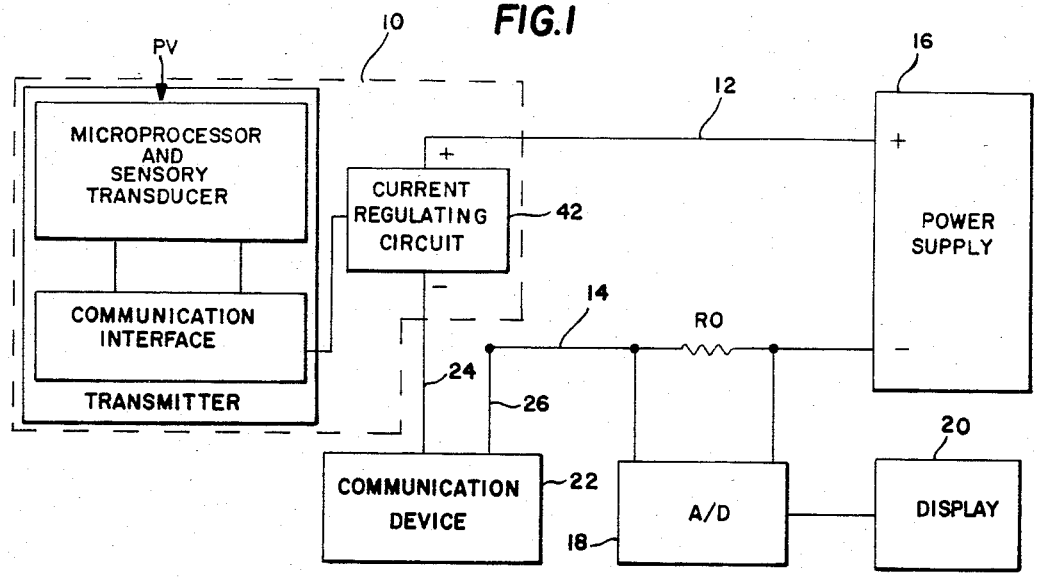
FIG. 1 is a block diagram showing a conventional current loop having a communication device such as a computer or hand-held terminal connected to the current loop.

Referring to the drawings in particular, the present invention provides an on-line serial communication between a transmitter 10 of a 4–20 mA current loop and the remainder of the loop including lines 12,14 and power supply 16 of said loop. As is known, one of the lines 14 may include a resistor RO, which has a voltage drop thereacross proportional to a current flowing in the lines 12,14. Transmitter 10 may include a transducer such as a pressure or temperature transducer (not shown) which receives a process variable PV. The transducer may be connected to a microprocessor in transmitter 10 which controls the amount of current to be drawn from power supply 16 on lines 12 and 14.

The voltage drop across resistor RO is measured by an analog-to-digital converter 18. This voltage drop can be displayed on a display unit 20 as a measurement of the process variable PV.

A communicating device 22 is connected to the current loop line 14 by connecting line 26. Communicating device 22 is a digital circuit such as a computer, mircroprocessor or hand-held terminal. Device 22 receives digital information in the form of voltage pulses on lines 24 and/or 26 for establishing digital communication with the current loop. Device 22 may be an RS-232C device. An RS-232C signal is a serial signal sent one bit at a time with a logic high between +3 and +12 volts and a logic low between −3 and −12 volts.

Figure 2:
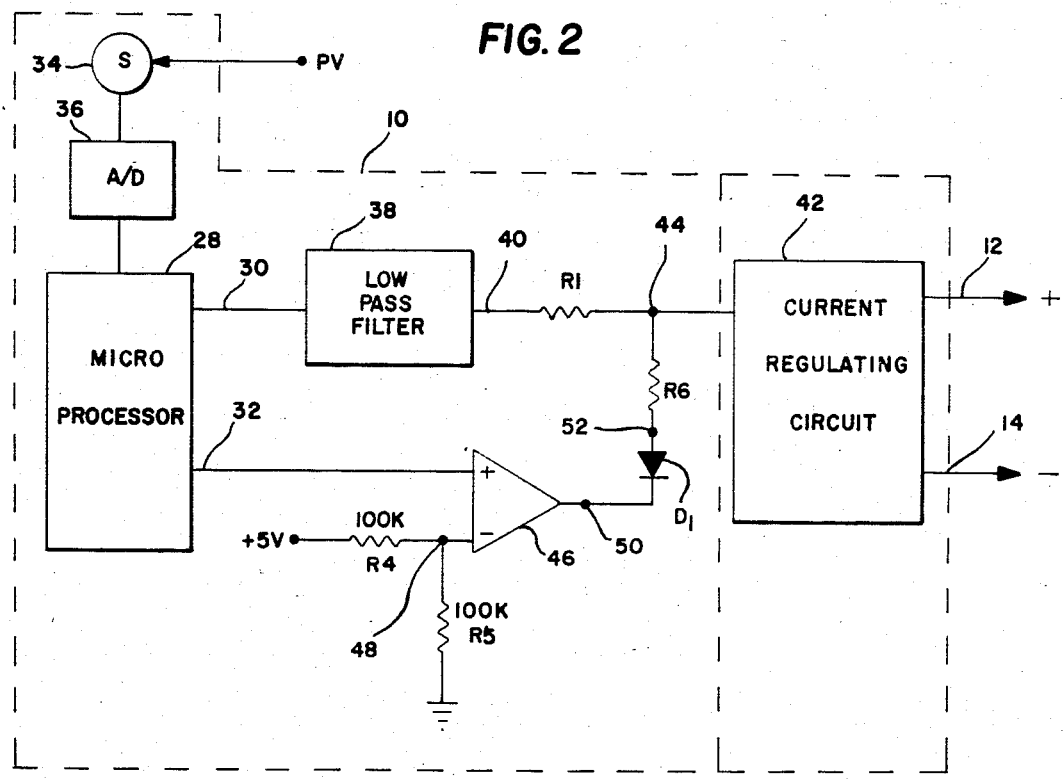
FIG. 2 is a schematic block diagram of the inventive on-line serial communication interface showing its interconnection with the transmitter of the current loop illustrated in FIG. 1.

FIG. 2 illustrates the on-line serial communication interface of the present invention.

As shown in FIG. 2, the transmitter which is generally designated 10 in FIG. 2, comprises a microprocessor 28 which has output ports 30 and 32. A process parameter PV is sensed by a sensor 34 such as a differential pressure or temperature sensor.

Sensor 34 generates an analog signal such a voltage level which is converted into a digital signal by analog-to-digital converter 36. The digital signal is provided to microprocessor 28 which outputs a digital signal corresponding to the process parameter on port 30. This signal is in the form of a voltage pulse train at a fixed frequency but with a duty cycle which varies according to the process parameter PV. For low pressure or temperature values for example a pulse train having very short pulse durations within a fixed time period is generated and applied to line 30. For higher signals from sensor 34, broader pulses are generated again within the fixed time period for each pulse.

A low pass filter 38 is connected to port 30 and generates a continuous voltage on its output 40. The level of this voltage is proportional to the duty cycle of the pulse on line 30 so that low pass filter 38 acts as a digital-to-analog convertor. The voltage is applied over resistor R1, to current regulating circuit 42 which is of known design and which draws an amount of current from power supply 16 on the current loop made up of lines 12 and 14, which are proportional to the signal from the low pass filter 38, and thus in turn proportional to the process parameter PV.

According to the present invention, microprocessor, 28 may also generate serial digital pulses on its second port 32. This can be used for establishing digital communication with the current loop made up of lines 12 and 14. It is noted that this digital communication can be superimposed on the analog information which is already applied to the current loop.

The two signals are combined at point 44 and applied in superimposed fashion to current regulating circuit 42. Circuit 42 thus receives two signals from microprocessor 28.

In the idle state (no communication) port 32 is at 5 volts. To establish communication, microprocessor 28 drops the voltage at port 32 to 0, volts and, thereafter, supplies voltage pulses over line 32.

A comparator 46 is provided which has a positive terminal connected to port 32. The negative input of comparator 46 is connected to a fixed source of voltage, in this case +5 volts, over a voltage divider made up of resistors R4 and R5, which are equal in value. In this way 2.5 volts appear at point 48 at the negative input of comparator 46. In the idle state port 32 is at +5 v, this places output point 50 of comparator 46 at +5 v because port 32 higher in voltage potential than point 48. Therefore point 52 is at 0 volts because D1 is turned off.

This 0 voltage is summed with the signal on output 40 of low pass filter 38 through the action of resistors R1 and R6. 0 voltage of point 52 is summed with the voltage from the low pass filter 38 and appears at point 44. This voltage level is used to drive the current regulating circuit 42.

When communication starts, output port 32 of microprocessor 28 falls from its idle state of 5 volts to 0 volts. Point 32 will then be below the voltage at point 48 so that output point 50 falls to minus 5 volts and point 52 to minus 4.3 volts. This is summed with the voltage on output 40 of low pass filter 38, and at point 44 by resistors R1 and R6. For every voltage pulse at port 32 therefore a serial string of information is produced at point 44. This amounts to a modulation of current for the current loop of about 1 mA. This is added to the analog current on the current loop of from 4 to 20 mA. In this way the transmitter 10 can communicate both by analog signals with the analog-to-digital converter 18 shown in FIG. 1, and, through the 1 mA pulses with communicating device 22. The current pulses are picked up by another interface (not shown) connected between the loop of lines 12 and 14, and the communicating device 22, to convert the current pulses to voltage pulses for operation of the communicating device 22.

The major advantage of the present invention is that communication can be achieved while the transmitter is still on-line with its controller. This is possible because the 1 mA pulses are modulated on top of the current which is already on the loop. The small fluctuation of current is active only during the short amount of time the transmitter is communicating. This is too fast for a controller to "see".

While a specific embodiment of the invention has been shown and described in detail to illustrate the application of the principles of the invention, it will be understood that the invention may be embodied otherwise without departing from such principles.

What is claimed is:

1. In a current loop arrangement having a power supply for supplying a current at various levels, a current loop connected to the power supply for carrying the current levels, a current regulating circuit connected to the current loop for drawing the current levels from the power supply according to a voltage applied to an input of the current regulating circuit, and a transmitter having microprocessor means with one port connected to the input of the current regulating circuit for applying a continuous voltage level to the current regulating circuit which is proportional to a process variable measured by the transmitter, the microprocessor means having a second port for supplying serial communication voltage pulses, an on-line serial communication interface, for establishing communication between the microprocessor and the current loop, comprising a comparator having an output connected to the input of the current regulating circuit, a first input connected to the second port of the microprocessor means for receiving the serial communication voltage pulses, and a second input adapted for connection to a source of fixed voltage at a selected level, whereby the current level drawn by the current regulating circuit is modulated.

2. An interface according to claim 1 including a voltage divider connected to the second input of said comparator made up of at least two resistors, all of said resistors being selected so that with said serial communication voltage pulses being at a voltage above said voltage on said second input of said comparator, with said output of said comparator being at a chosen plus voltage, and said serial communication voltage pulses being below said voltage on said second input of said comparator, with said output of said comparator being at a chosen minus voltage.

3. An interface according to claim 1 including a low pass filter connected between the first port of the microprocessor means and the input of the current regulating circuit, the microprocessor means generating voltage pulses having a variable duty cycle which varies with the process variable, said low pass filter having an output connected to the current regulating circuit input which carries a voltage level corresponding to said duty cycle.

4. An interface according to claim 3, wherein said low pass filter is selected to generate a voltage level between limits for causing said current regulating circuit to draw from 4 to 20 mA from the power supply onto the current loop, said resistors being selected for applying voltage pulses on the input of the current regulating circuit which causes the current regulating circuit to vary the amount of current it draws from the power supply by about 1 mA.

* * * * *